United States Patent Office 3,431,273
Patented Mar. 4, 1969

3,431,273
1-OXA-4-AZASPIRO[4.5]-6,9-DECADIENE COMPOUNDS
Bernard Loev, Broomall, Pa., assignor to Smith Kline & French Laboratories, Philadelphia, Pa., a corporation of Pennsylvania
No Drawing. Filed Mar. 14, 1967, Ser. No. 622,915
U.S. Cl. 260—307      4 Claims
Int. Cl. C07d 85/26, 5/16, 31/40

ABSTRACT OF THE DISCLOSURE

Spiro compounds having anorectic, antidepressant and diuretic activity are prepared by reacting an α-aminoalkyl substituted methanol with 4-lower alkyl-2,5-cyclohexadien-1-one having a 4-methyl substituent which is optionally substituted by from 1 to 3 chlorine atoms.

---

This invention relates to new 1-oxa-4-azaspiro[4.5] 6,9-decadiene compounds which have pharmacodynamic activity, in particular anorectic, antidepressant, diuretic and hypotensive activity.

The compounds of this invention are represented by the following formula:

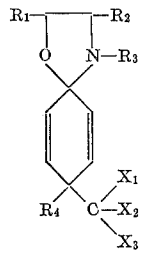

in which:

$R_1$ is phenyl, phenyl substituted by from one to two halo, hydroxy, lower alkyl or lower alkoxy substituents, trifluoromethylphenyl, cyanophenyl, methylenedioxyphenyl, pyridyl, furyl or thienyl;
$R_2$ is lower alkyl;
$R_3$ is hydrogen or lower alkyl;
$R_4$ is lower alkyl; and
$X_1$, $X_2$ and $X_3$ are chloro or hydrogen.

Advantageous compounds of this invention are represented by the above formula in which $R_1$ is phenyl, halophenyl, dihalophenyl, hydroxyphenyl, dihydroxyphenyl, tolyl, xylyl, methoxyphenyl, dimethoxyphenyl and methylenedioxyphenyl, $R_2$ is methyl, $R_3$ is hydrogen or methyl, $R_4$ is methyl and $X_1$, $X_2$ and $X_3$ are chloro.

A preferred compound of this invention is 3,8-dimethyl-2-phenyl-8-trichloromethyl-1-oxa-4-azaspiro[4.5] 6,9-decadiene.

The compounds of this invention are prepared by the following procedure:

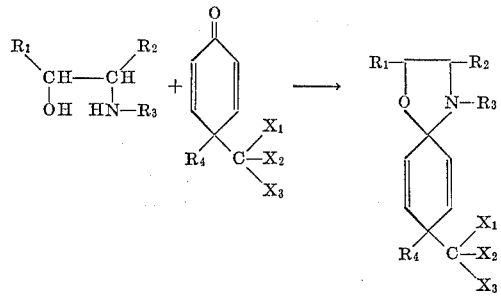

The terms $R_1$, $R_2$, $R_3$, $R_4$, $X_1$, $X_2$ and $X_3$ are as defined above.

According to the above procedure, an α-aminoalkyl substituted methanol is reacted with a 4-lower alkyl-2,5-cyclohexadien-1-one having a 4-methyl substituent which is optionally substituted by from 1 to 3 chlorine atoms. The reaction is preferably carried out in an inert solvent such as ethyl acetate or a mixture of inert solvents such as benzene-ethyl acetate. Advantageously, water is removed during the reaction by using an azeotroping device or a drying agent such as magnesium sulfate or molecular sieve. Optionally, an acid catalyst such as methane sulfonic acid, toluene sulfonic acid or a strong acid ion exchange resin may be employed, in particular when an azeotroping device is used.

The α-aminoalkyl substituted methanol starting materials are either known to the art or are prepared by the following procedures:

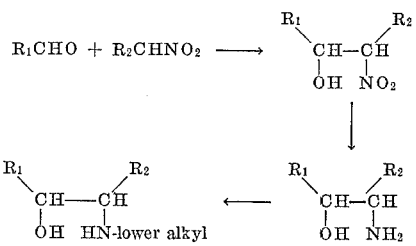

The terms $R_1$ and $R_2$ are as defined above.

According to the above procedure, a carboxaldehyde is condensed with a nitroalkane in the presence of a basic condensing agent such as a sodium methoxide in a solvent such as a methanol. Treating with acid such as dilute acetic acid gives the α-nitroalkyl substituted methanol. This nitro alcohol is reduced, for example with lithium aluminum hydride in tetrahydrofuran, to give the α-primary aminoalkyl substituted methanol starting materials. Alkylation of the primary amino compounds by, for example, reacting with a lower alkyl halide or with an acylating agent such as ethyl formate or acetyl chloride and reducing the resulting N-acylamino alcohol with a reducing agent such as lithium aluminum hydride gives the α-mono-lower alkylaminoalkyl substituted methanol starting materials.

The cyclohexadienone starting materials are either known to the art or prepared by known procedures. The 4-lower alkyl-4-trichloromethyl-2,5-cyclohexadien-1-ones are prepared by reacting a p-lower alkylphenol with carbon tetrachloride in the presence of aluminum chloride. The 4-dichloromethyl and 4-chloromethylcyclohexadienone starting materials are prepared by the same procedure using chloroform and bromochloromethane, respectively, in place of carbon tetrachloride. The 4-lower alkyl-4-methylcyclohexadienone starting materials are prepared from 4-lower alkyl-4-methylcyclohexanones by dibromination with bromine in acetic acid and dehydrobromination of the 2,6-dibromo compound with quinoline by the method described by Yanagita et al., J. Pharm. Soc., Japan, 71: 1060–1064 (1951). The 4-lower alkyl-4-methylcyclohexanones are either known to the art or are prepared from 4-dichloromethyl-4-methyl-2,5-cyclohexadiene-1-one by the method described by Auwers et al., Ann., 401: 303–326 (1913).

The compounds of this invention may exist in stereoisomeric forms, that is, as $d$ and $l$-optical isomers as well as $dl$-mixtures and as cis and trans-isomers as well as cis-trans mixtures. It is intended that the general formulas presented herein include all of these stereoisomers, the separated isomers as well as mixtures thereof. The isomers are conveniently prepared from the corresponding isomers of the α-aminoalkyl substituted methanol starting materials.

The terms "lower alkyl" or "lower alkoxy" where used herein denote groups having 1–4, preferably 1–2, carbon atoms.

The compounds of this invention may be combined with pharmaceutical carriers according to accepted pharmaceutical practices and administered internally in conventional dosage forms containing an appropriate dose of the compound.

The following examples are not limiting but are illustrative of this invention.

EXAMPLE 1

Five grams of dl-norephedrine is added to 7.5 g. of 4 - methyl - 4 - trichloromethyl-2,5-cyclohexadien-1-one in 125 ml. of benzene-ethyl acetate. To this mixture is added 15 g. of magnesium sulfate and the mixture is stirred at room temperature for five days, adding 15 g. of magnesium sulfate on the third day. The mixture is then filtered and the filtrate is concentrated. The residue is dissolved in boiling isopropyl ether and the resulting solution is filtered, treated with charcoal, concentrated slightly, chilled and filtered. The solid material is recrystallized from isopropyl ether to give dl-3,8-dimethyl-2-phenyl-8-trichloromethyl-1-oxa-4-azaspiro[4.5]-6,9-decadiene.

Similarly, using 5 g. of d-norephedrine in the above procedure the product is d-3,8-dimethyl-2-phenyl-8-trichloromethyl-1-oxa-4-azaspiro[4.5]-6,9-decodiene.

In the same manner, using l-norephedrine the product is l - 3,8 - dimethyl - 2 - phenyl - 8 - trichloromethyl - 1-oxa-4-azaspiro[4.5]-6,9-decadiene.

EXAMPLE 2 p-Hydroxyephedrine (18.1 g.) is added to 22.4 g. of 4 - methyl-4-trichloromethyl-2,5-cyclohexadiene-1-one in 150 ml. of tetrahydrofuran. A dehydrating molecular sieve (25 g.) is added and the resulting mixture is stirred at 40° C. for three days. The mixture is filtered and the filtrate is concentrated, in vacuo. The residue is recrystallized from ethanol-water to give 2-(p-hydroxyphenyl) - 3,4,8 - trimethyl - 8 - trichloromethyl-1-oxa-4-azaspiro[4.5]-6,9-decadiene.

EXAMPLE 3

By the procedure of Example 2 using, in place of p-hydroxyephedrine, 0.1 m. of the following:

o-Chloroephedrine
p-Fluoroephedrine
p-Methylephedrine
p-Butylephedrine
p-Methoxyephedrine
3,4-methylenedioxyephedrine
3,4-dichloroephedrine the following products are obtained, respectively:

2 - (o - chlorophenyl) - 3,4,8 - trimethyl - 8 - trichloromethyl-1-oxa-4-azaspiro[4.5]-6,9-decadiene,
2 - (p - fluorophenyl) - 3,4,8 - trimethyl - 8 - trichloromethyl-1-oxa-4-azaspiro[4.5]-6,9-decadiene,
3,4,8 - trimethyl - 2 - (p - methylphenyl) - 8 - trichloromethyl-1-oxa-4-azaspiro[4.5]-6,9-decadiene,
2 - (p - butylphenyl) - 3,4,8 - trimethyl - 8 - trichloromethyl-1-oxa-4-azaspiro[4.5]-6,9-decadiene,
2 - (p - methoxyphenyl) - 3,4,8 - trimethyl - 8 - trichloromethyl-1-oxa-4-azaspiro[4.5]-6,9-decadiene,
3,4,8 - trimethyl - 2 - (3,4 - methylenedioxyphenyl)-8-trichloromethyl-1-oxa-4-azaspiro[4.5]-6,9-decadiene,
2 - (3,4 - dichlorophenyl) - 3,4,8 - trimethyl - 8 - trichloromethyl-1-oxa-4-azaspiro[4.5]-6,9-decadiene.

EXAMPLE 4

By the procedure of Example 2, 26.7 g. of α-(1-aminobutyl)-3,4-diethoxybenzyl alcohol is reacted with 22.4 g. of 4 - methyl - 4 - trichloromethyl - 2,5 - cyclohexadiene-1-one to give 2-(3,4-diethoxyphenyl)-8-methyl-3-propyl-8-trichloromethyl-1-oxa-4-azaspiro[4.5]-6,9-decadiene.

Similarly, using α-(1-aminoethyl)-2,5-dimethoxybenzyl alcohol and α-(1-aminoethyl)-m-hydroxybenzyl alcohol in the procedure of Example 2, the products are 2-(2,5-dimethoxyphenyl) - 3,8 - dimethyl - 8 - trichloromethyl-1 - oxa - 4 - azaspiro[4.5] - 6,9 - decadiene and 2 - (m-hydroxyphenyl) - 3,8 - dimethyl - 8 - trichloromethyl - 1-oxa-4-azaspiro[4.5]-6,9-decadiene, respectively.

EXAMPLE 5

According to the procedure of Example 2, 0.1 m. of each of the following α-(1-aminoethyl)benzyl alcohol compounds is reacted with 0.1 m. of 4 - methyl - 4 - trichloromethyl-2,5-cyclohexadiene-1-one:

α-(1-aminoethyl)-p-bromobenzyl alcohol
α-(1-aminoethyl)-3,4-dihydroxybenzyl alcohol
α-(1-aminoethyl)-3,4-dimethylbenzyl alcohol
α-(1-aminoethyl)-2-methoxy-5-methylbenzyl alcohol to give the following products, respectively:

2 - (p - bromophenyl) - 3,8 - dimethyl - 8 - trichloromethyl-1-oxa-4-azaspiro[4.5]-6,9-decadiene,
2 - (3,4 - dihydroxyphenyl) - 3,8 - dimethyl - 8 - trichloromethyl-1-oxa-4-azaspiro[4.5]-6,9-decadiene,
3,8 - dimethyl - 8 - trichloromethyl - 2 - (3,4 - xylyl)-1-oxa-4-azaspiro[4.5]-6,9-decadiene,
2 - (2 - methoxy - 5 - methylphenyl) - 3,8 - dimethyl-8-trichloromethyl-1-oxa-4-azaspiro[4.5]-6,9-decadiene.

EXAMPLE 6

To 22.4 g. of 4-methyl-4-trichloromethyl-2,5-cyclohexadien-1-one in 100 ml. of ethyl acetate is added 15.5 g. of α-(1-methylaminoethyl)furfuryl alcohol and 0.5 g. of toluene sulfonic acid. The mixture is heated under a water azeotroping device until the theoretical amount of water is evolved. The solvent is distilled out and the residue is recrystallized from ether-hexane to give 2 - (2 - furyl) - 3,4,8 - trimethyl - 8 - trichloromethyl-1-oxa-4-azaspiro[4.5]-6,9-decadiene.

Similarly, reacting 15.5 g. of α-(1-aminopropyl)furfuryl alcohol and 22.4 g. of 4-methyl-4-trichloromethyl-2,5-cyclohexadien-1-one by the above procedure 3-ethyl-2-(2 - furyl) - 4,8 - dimethyl - 8 - trichloromethyl - 1-oxa-4-azaspiro[4.5]-6,9-decadiene is obtained.

By the same procedure, using 15.2 g. of α-(1-aminoethyl)-3-pyridinemethanol and 22.4 g. of 4-methyl-4-trichloromethyl-2,5-cyclohexadien-1-one the product is 3,8-dimethyl - 2 - (3 - pyridyl) - 8 - trichloromethyl - 1 - oxa-4-azaspiro[4.5]-6,9-decadien.

EXAMPLE 7

To 17.4 g. of p-trifluoromethylbenzaldehyde and 15 g. of nitroethane in 60 ml. of ethanol at 0° C. is added a solution of 5.4 g. of sodium methoxide in 60 ml. of methanol. The resulting mixture is stirred at room temperature for six hours, then cooled and the solid material is filtered off and dissolved in water. Dilute acetic acid is added. Extracting with ether and removing the ether from the extract gives 2 - nitro - 1 - (p - trifluoromethylphenyl)propanol.

A mixture of 24.9 g. of the above prepared nitropropanol compound, 4.0 g. of lithium aluminum hydride and 350 ml. of tetrahydrofuran is stirred for two hours, then hydrolyzed by pouring into water. The mixture is made strongly alkaline with aqueous sodium hydroxide and the oil is extracted with chloroform. The extract is evaporated, in vacuo, to give α-(1-aminoethyl)-p-trifluoromethylbenzyl alcohol.

To 11.2 g. of 4-methyl-4-trichloromethyl-2,6-cyclohexadien-1-one in 50 ml. of ethyl acetate is added 11 g. of the above prepared α-(1-aminoethyl)-p-trifluoromethylbenzyl alcohol. The mixture is stirred at 40° C. for four days with 20 g. of magnesium sulfate, then worked up as in Example 2 to give 3,8-dimethyl-8-trichloromethyl-2-(p-trifluoromethylphenyl)-1 - oxa-4-azaspiro[4.5]-6,9-decadiene.

Similarly, using p-cyanobenzaldehyde and 2-thiophenecarboxaldehyde in place of p-trifluoromethylbenzaldehyde in the above procedure the following products are obtained, respectively:

2-(p-cyanophenyl)-3,8-dimethyl - 8-trichloromethyl-1-oxa-4-azaspiro[4.5]-6,9-decadiene.

3,8-dimethyl-2-(2-thienyl) - 8-trichloromethyl-1-oxa-4-azaspiro[4.5]-6,9-decadiene.

EXAMPLE 8

A solution of 5.7 g. of p-ethylphenol in 5 ml. of carbon disulfide is added dropwise to 8.33 g. of aluminum chloride in 25 ml. of carbon disulfide. Then 7.7 g. of carbon tetrachloride is added and the resulting mixture is heated at 45° C. for two hours, then poured onto ice and steam distilled to give 4-ethyl-4-trichloromethyl-2,5-cyclohexadien-1-one.

To 11.9 g. of 4-ethyl-4-trichloromethyl-2,5-cyclohexadien-1-one in 50 ml. of ethyl acetate is added 7.6 g. of norephedrine and 10 g. of calcium chloride. The mixture is stirred at room temperature for six days to give, after working up as in Example 2, 8-ethyl-3-methyl-2-phenyl-8-trichloromethyl-1-oxa-4-azaspiro[4.5]-6,9-decadiene.

By the same procedure, using p-butylphenol the product is 8-butyl-3-methyl-2-phenyl-8-trichloromethyl-1-oxa-4-azaspiro[4.5]-6,9-decadiene.

EXAMPLE 9

By the procedure of Example 2, using, in place of p-hydroxyephedrine, the following:

α-(1-ethylaminoethyl)benzyl alcohol
α-[1-(n-butyl)aminoethyl]benzyl alcohol the products are, respectively:

4-ethyl-3,8-dimethyl-2-phenyl - 8 - trichloromethyl-1-oxa-4-azaspiro[4.5]-6,9-decadiene, 4-butyl - 3,8 - dimethyl-2-phenyl-8-trichloromethyl-1-oxa-4-azaspiro[4.5]-6,9-decadiene.

EXAMPLE 10

To 9.5 g. of 4-dichloromethyl-4-methyl-2,5-cyclohexadien-1-one in 200 ml. of benzene-ethyl acetate is added 8.2 g. of ephedrine. Magnesium sulfate (30 g.) is added and the mixture is stirred at room temperature for three days. Working up as in Example 1 gives 8-dichloromethyl-3,4,8-trimethyl-2-phenyl-1-oxa-4 - azaspiro[4.5] - 6,9-decadiene.

EXAMPLE 11

A solution of 5.4 g. of p-cresol in 5 ml. of carbon disulfide is added dropwise to 8.33 g. of aluminum chloride in 25 ml. of carbon disulfide. To this mixture is added 6.5 g. of bromochloromethane. Heating the reaction mixture at 45° C. for two hours, then pouring it onto ice and steam distilling gives 4-chloromethyl-4-methyl-2,5-cyclohexadien-1-one.

Norephedrine (5.0 g.) is added to 5.2 g. of 4-chloromethyl-4-methyl-2,5-cyclohexadien-1-one in 125 ml. of benzene-ethyl acetate. Dehydrating molecular sieve (15 g.) is added and the mixture is stirred at 40° C. for three days to give, after filtering, concentrating the filtrate in vacuo and recrystallizing the residue from ethanol-water, 8-chloromethyl-3,8 - dimethyl - 2-phenyl-1-oxa-4-azaspiro[4.5]-6,9-decadiene.

By the same procedure, using 7.5 g. of p-butylphenol the product is 8-butyl-8-chloromethyl-3-methyl-2-phenyl-1-oxa-4-azaspiro[4.5]-6,9-decadiene.

EXAMPLE 12

Ephedrine (16.5 g.) is added to 12.2 g. of 4,4-dimethyl-2,5-cyclohexadien-1-one in 300 ml. of benzene-ethyl acetate. Magnesium sulfate (45 g.) is added and the mixture is stirred at room temperature for three days. Filtering, concentrating the filtrate in vacuo and recrystallizing the residue from isopropyl ether gives 3,4,8,8-tetramethyl-2-phenyl-1-oxa-4-azaspiro[4.5]-6,9-decadiene.

Similarly, using 13.6 g. of 4-ethyl-4-methyl-2,5-cyclohexadien-1-one (prepared by dibrominating 4-ethyl-4-methylcyclohexanone with bromine in acetic acid and dehydrobrominating with quinoline) in the above procedure gives 8 - ethyl - 3,4,8-trimethyl-2-phenyl-1-oxa-4-azaspiro[4.5]-6,9-decadiene.

What is claimed is:

1. A compound of the formula:

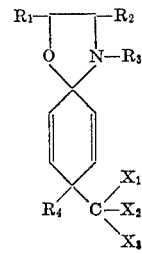

in which:

$R_1$ is phenyl, phenyl substituted by from one to two halo, hydroxy, lower alkyl or lower alkoxy substituents, trifluoromethylphenyl, cyanophenyl, methylenedioxyphenyl, pyridyl, furyl or thienyl;

$R_2$ is lower alkyl;

$R_3$ is hydrogen or lower alkyl;

$R_4$ is lower alkyl; and $X_1$, $X_2$ and $X_3$ are hydrogen or chloro.

2. A compound according to claim 1 in which $R_1$ is phenyl, $R_2$ is methyl, $R_3$ is hydrogen and $R_4$ is methyl.

3. A compound according to claim 1 in which $R_1$ is m-hydroxyphenyl, $R_2$ is methyl, $R_3$ is hydrogen and $R_4$ is methyl.

4. A compound according to claim 1 in which $R_1$ is 2,5-dimethoxyphenyl, $R_2$ is methyl, $R_3$ is hydrogen and $R_4$ is methyl.

References Cited

UNITED STATES PATENTS 3,264,319    8/1966    Kamal _____ 260—307

ALTON D. ROLLINS, *Primary Examiner.*

U.S. Cl. X.R.

167—55, 65; 260—296, 332.3, 340.5, 347.7, 465, 570.6, 586, 618